US008689482B2

(12) United States Patent
Cooke et al.

(10) Patent No.: US 8,689,482 B2
(45) Date of Patent: Apr. 8, 2014

(54) APPARATUS AND METHOD FOR PRODUCING AND HARVESTING ALGAE

(75) Inventors: William E. Cooke, Williamsburg, VA (US); Eugene R. Tracy, Williamsburg, VA (US); Karl W. Kuschner, Williamsburg, VA (US); J. Emmett Duffy, Gloucester Point, VA (US); Dennis M. Manos, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 102 days.

(21) Appl. No.: 13/366,516

(22) Filed: Feb. 6, 2012

(65) Prior Publication Data

US 2012/0198761 A1 Aug. 9, 2012

Related U.S. Application Data

(60) Provisional application No. 61/439,972, filed on Feb. 7, 2011.

(51) Int. Cl.
*A01G 13/00* (2006.01)
*A01H 7/00* (2006.01)

(52) U.S. Cl.
USPC .......... 47/1.4

(58) Field of Classification Search
USPC .......... 47/1.4; 119/238, 239
See application file for complete search history.

(56) References Cited

U.S. PATENT DOCUMENTS

| | | | |
|---|---|---|---|
| 4,275,545 A * | 6/1981 | Pace | 56/8 |
| 4,333,263 A | 6/1982 | Adey | |
| 4,950,104 A * | 8/1990 | Streichenberger | 405/24 |
| 5,309,672 A * | 5/1994 | Spencer et al. | 47/1.4 |
| 5,851,398 A | 12/1998 | Adey | |
| 6,244,218 B1 * | 6/2001 | McNeil | 119/223 |
| 6,343,567 B1 * | 2/2002 | McNeil et al. | 119/256 |
| 6,572,770 B1 | 6/2003 | Stewart, III et al. | |
| 7,997,025 B1 | 8/2011 | Masse | |
| 8,056,308 B2 | 11/2011 | Shonnard | |
| 8,126,780 B2 * | 2/2012 | Iwai et al. | 705/26.1 |
| 2010/0037469 A1 * | 2/2010 | Chubb | 30/198 |
| 2011/0247262 A1 * | 10/2011 | Lee et al. | 47/1.4 |

OTHER PUBLICATIONS

Adey et al., "Coral reef algal turfs: master producers in nutrient-poor seas", Phycologia, (1987), vol. 26(3), pp. 374-386.

* cited by examiner

*Primary Examiner* — Andrea Valenti
(74) *Attorney, Agent, or Firm* — Jason P. McDevitt

(57) ABSTRACT

An apparatus and method are described for producing and harvesting algae. The orientation of the production substrates is critical for maximizing production as a function of water area utilized. By employing an array of algae production substrates in a vertical configuration relative to the water surface, the yield of algae production per area of open water is increased substantially relative to prior art algae production systems.

13 Claims, 13 Drawing Sheets

30
20
14

APPARATUS AND METHOD FOR PRODUCING AND HARVESTING ALGAE

CROSS-REFERENCE TO RELATED APPLICATIONS

This application claims the benefit of and priority to U.S. Provisional Patent Application Ser. No. 61/439,972, filed Feb. 7, 2011, the entire disclosure of which is incorporated by reference herein.

STATEMENT REGARDING FEDERALLY SPONSORED RESEARCH AND DEVELOPMENT

Not applicable.

FIELD OF INVENTION

This invention relates to an apparatus and method for producing and harvesting algae.

BACKGROUND OF THE INVENTION

This invention relates to an apparatus and method for producing and harvesting algae. Algae is known to clean water sources by reducing pollutants. Additionally, algae can potentially serve as a viable renewable energy source.

Patents reporting the usefulness of algae production systems are well-known. For example, Adey discloses a method of producing algal turf comprising providing a horizontal growing surface, subjecting the surface to water surge motion, and periodically harvesting the crop. By way of background, see U.S. Pat. No. 4,333,263 to Adey, U.S. Pat. No. 5,851,398 to Adey, and U.S. Pat. No. 6,572,770 to Stewart. Furthermore, research by Walter Adey et al. demonstrates that horizontally oriented substrates can grow algae in some waters when submerged to depths of 12 meters (*Phycologia* (1987), Volume 26(3), pp. 374-386).

BRIEF SUMMARY OF THE INVENTION

Herein we describe a modular apparatus and method for producing and harvesting algae in an open body of water, hereby defined as a body of water, either man-made or natural, that is open to the elements of nature including run-off from adjacent land. By employing algae production substrates in a vertical configuration relative to the water surface, this invention represents a significant departure from current in-water algae growing systems.

It is an object of the invention to significantly increase the yield of algae produced per unit area of open water relative to prior art algae growing systems. In one embodiment, a plurality of substrates is oriented perpendicular to the water surface, increasing the cumulative area of substrates per unit area of open water, as the algae are produced on vertically oriented substrates extending down into the water. The optical qualities of water allow algae to grow at a significant depth below the water surface, which can add to the increase in yield. In addition to algae that require significant light to grow (autotrophs), varieties of algae produced according to the methods and systems of the claimed invention include numerous species that are able to grow under conditions of very low light levels (heterotrophs), allowing potentially good accumulation to occur at greater depths even in turbid waters, as long as nutrient levels are sufficient. Other non-algal material also can accumulate on the substrates.

By optimizing the orientation of the substrates relative to the current, the strain on the substrates is significantly reduced, leading to less tearing and maintenance costs. Furthermore, by optimizing packing density such that many vertically aligned substrates are used to grow algae within a given area of water, the yield of algae per unit area of open water can be increased. In an exemplary embodiment of the invention, an array of five or more substrates are aligned vertically such that the spacing between the substrates is between 9 cm and 51 cm, and the majority, if not all, of the substrates have a dimension perpendicular to said water surface of greater than 0.5 meters (i.e., said substrates have a length of at least 0.5 meters extending perpendicular to the water surface into the water), in some embodiments greater than one meter, and in some embodiments the majority of said substrates have a dimension perpendicular to the water surface of greater than five meters.

It is a further object of the invention to harvest algae such that subsequent production of algae is maximized. This can be accomplished using a method of harvesting that leaves a substantial standing crop attached to the substrates, as this practice can increase average production rates between harvests.

BRIEF DESCRIPTION OF THE DRAWINGS

The summary above, and the following detailed description, will be better understood in view of the drawings that depict details of preferred embodiments.

DETAILED DESCRIPTION OF THE INVENTION

With reference to the drawings, a novel apparatus and method for growing and harvesting algae embodying the principles and concepts of the present invention is described herein.

Figure 1:
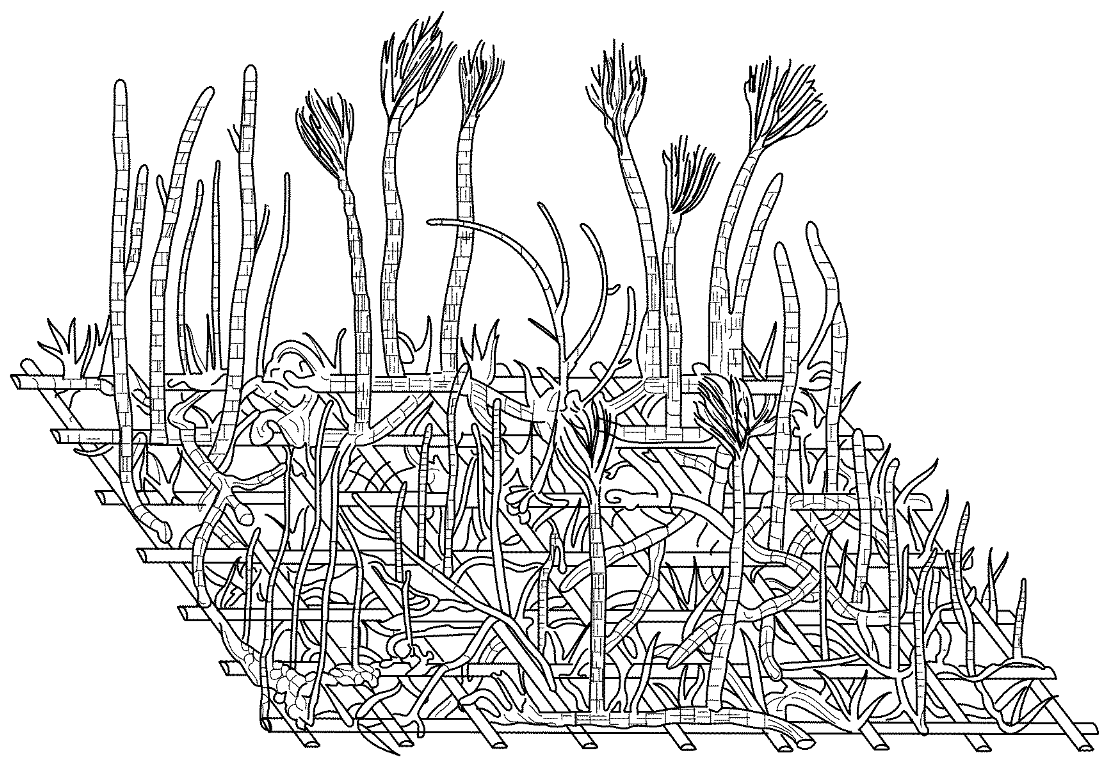
FIG. 1 is a schematic view of prior art filamentous algae grown on a submerged substrate.
Figure 2:
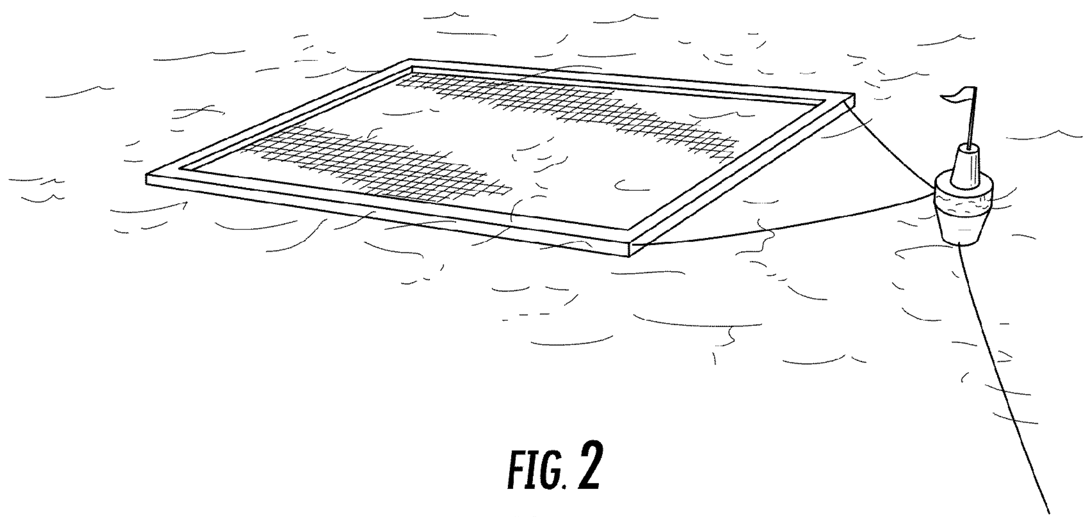
FIG. 2 is a schematic view of the orientation of substrates detailed in the prior art.

As shown in FIG. 1 and FIG. 2, the prior art focuses on filamentous algae grown on substrates that are submerged or floating on the surface of a body of water. The term "substrate" is defined as the base or material on which a non-motile organism lives or grows. The total algal crop depends on the areal density (number of filaments attached per unit area of substrate) times the average filament length. Often, it is impossible to determine an average filament length after harvesting a land-based flow-way because a vacuum harvest tends to break the filaments into small pieces that no longer represent their original length.

The filamentous algae reproduce by cellular division, so the instantaneous growth rate at any time is proportional to the number of algal cells present, so long as each reproducing cell has available light of proper spectral character, adequate nutrient levels, and can discharge metabolic waste. In practice, other factors limit growth, for example, self-shading, sloughing off of the algae, and grazing by species that use algae as a food source. In operation, the substrate shown in FIG. 2 will allow algae to grow on the top side of the substrate. In typical prior art embodiments, the substrate is scooped up onto a ramp and the algal turf is mechanically or hand-raked while the substrate is out of the water.

Figure 4:
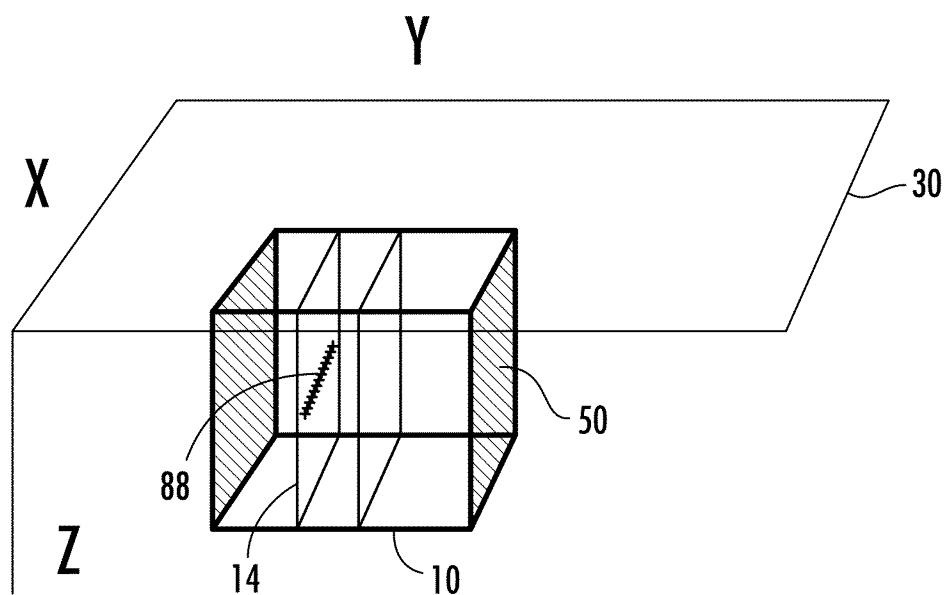
FIG. 4 is a schematic view of the modular apparatus deployed in open water in accordance with this invention.

A representative embodiment of the invention is depicted in FIG. 4, which shows a modular apparatus 10 for growing and harvesting algae. The modular apparatus 10 comprises a substantially rigid rectangular cage 100, with vertical slots. Each slot accommodates a substantially rigid frame which surrounds a substrate 14. The overall number of substrates 14 which are contained within each modular apparatus 10 will be determined in part by the packing density of the substrates with respect to adequate ambient lighting and nutrients. The modular apparatus 10 allows easy repair and replacement of a frame or substrate 14 with a minimum of disruption to the other frames or substrates within the apparatus 10.

The modular apparatus 10 is constructed for use in an open body of water. In some embodiments of the invention, the open body of water has an area exceeding 1 acre, and in other embodiments, the open body of water exceeds 10 acres in surface area. Suitable open bodies of water include but are not limited to lakes, rivers, oceans, streams and ponds, including for example retention ponds, remediation ponds, and fracking ponds. Closed water systems that are not open to the elements, including typical industrial bioreactors, are not open bodies of water according to this definition. The term "water surface" is defined as the time-averaged horizontal surface that forms the apparent boundary between the water and the sky. Referring again to FIG. 4, the water surface 30 defines a plane (x-y plane). The z-axis extends from the center of the earth and is normal to the time-averaged water surface 30. The z-axis is defined as the direction normal to both the x- and y-axes, see FIG. 4. The "line of current" is defined as the average vector direction of the below-surface flow of water, which allows the possibility that the current may reverse direction, as in a tidal estuarine environment, see FIG. 6. The line of current 20 is contained in a plane substantially parallel to the x-y plane at the average depth of the substrate. The line of current 20 is near the substrate 14, inside the modular apparatus 10. The surface current might not always align with the prevailing underwater current, particularly in shallow water. Wind, for example, can change the current direction near the surface.

Figure 3:
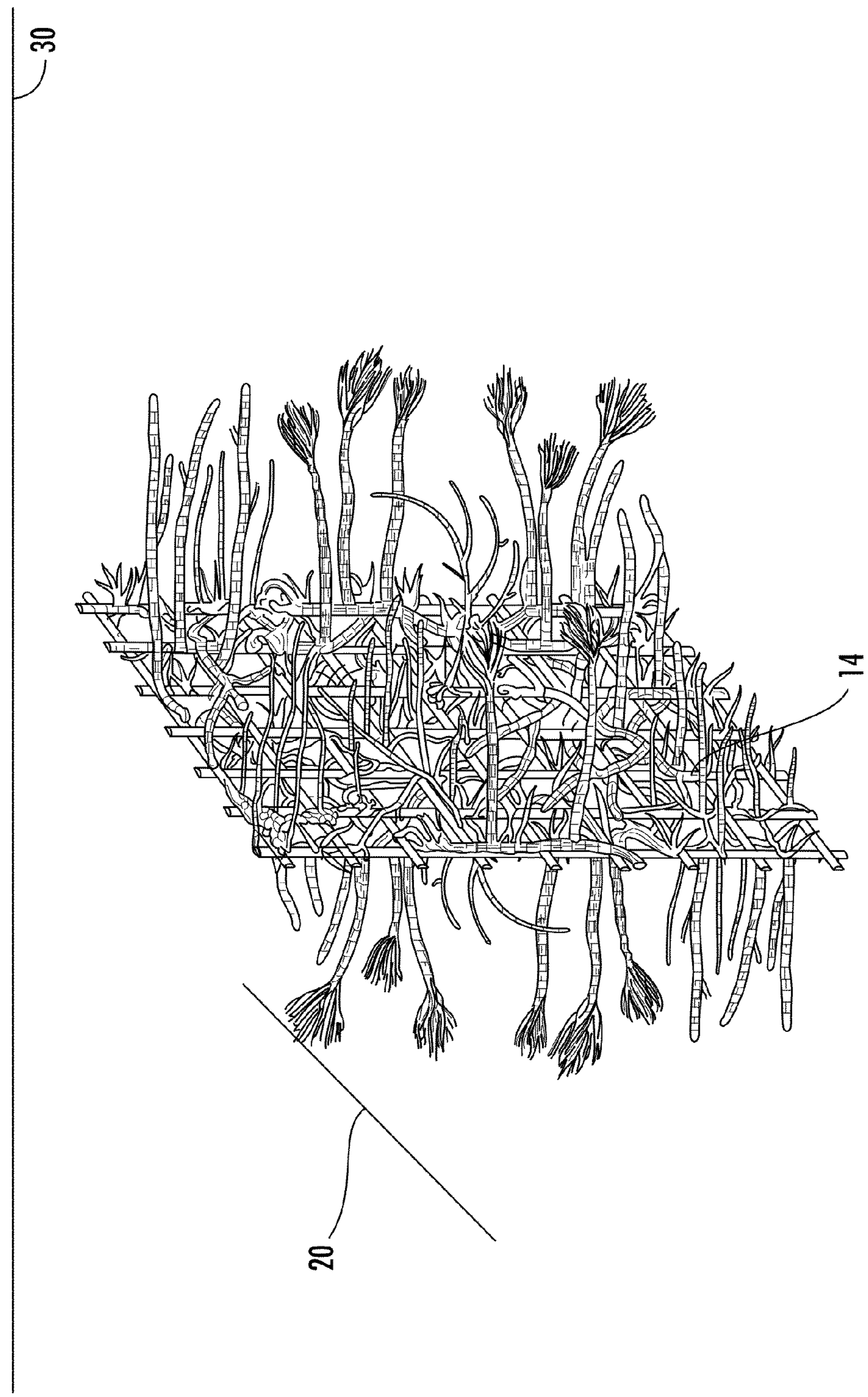
FIG. 3 is a schematic view of the vertical substrate with filamentous algae in accordance with this invention.

FIG. 3 is a schematic depiction of a substrate 14 within the modular apparatus 10 of FIG. 4. In one embodiment, the substrate 14 is surrounded by a frame that is substantially rigid. The frame is substantially rigid in order to withstand the force of water currents and reduce the likelihood of damage to certain substrate materials.

Returning to FIG. 4, when deployed in open water, the modular apparatus 10 identically restrains each substrate 14. In the coordinate system as previously defined, the substrate 14 has a planar surface, and a thickness. The planar surface of the substrate 14 contains a line 88 at the average depth of the substrate 14. The term "thickness" is defined as the dimension of the substrate 14 with the smallest magnitude.

Upon deployment in the water as a part of modular apparatus 10, the substrate 14 is oriented such that the planar surface of the substrate 14 is "substantially perpendicular" to the water surface 30. This orientation enables the maximum packing density. Additionally, the substrate 14 is oriented such that the planar surface of the substrate 14 "substantially contains" the line of current. Upon deployment, water flows primarily along the planar surface of the substrate 14 rather than through the substrate 14. This orientation is the lowest strain position, which lessens the potential for damage.

Figure 5:
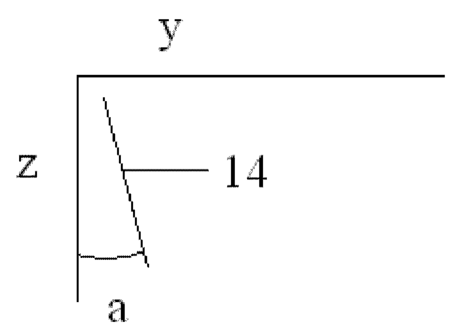
FIG. 5 is a schematic view of the substrate oriented such that the planar surface of the substrate is "substantially perpendicular" to the water surface.
Figure 6:
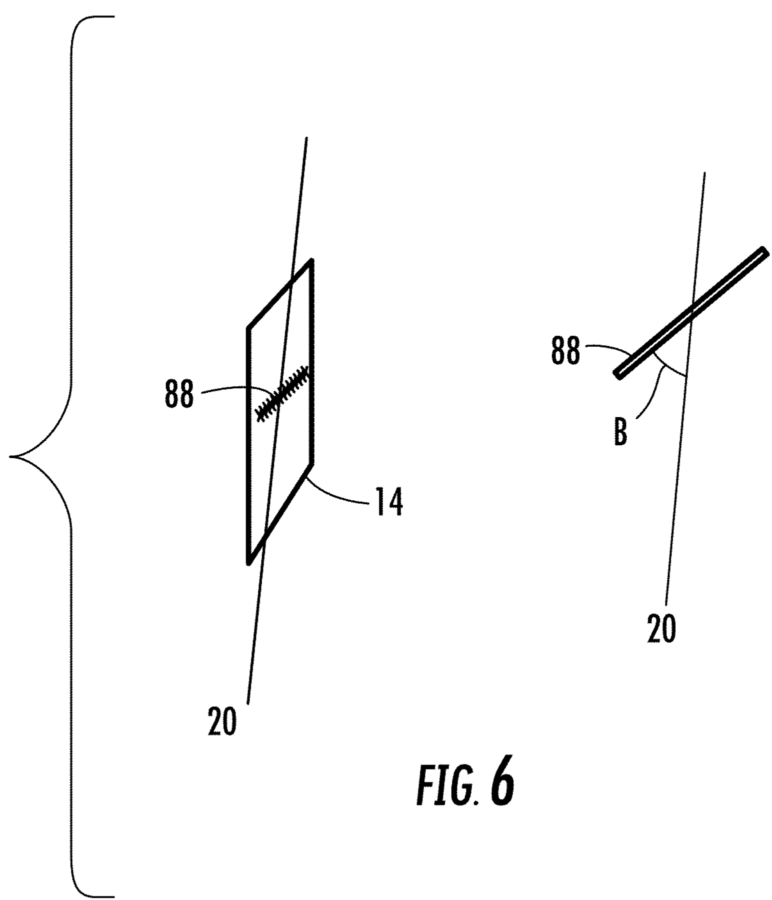
FIG. 6 is a schematic view of a substrate oriented such that the planar surface of the substrate "substantially contains" the line of current.

The term "substantially perpendicular" is defined as within a +/−20 degree deviation of the planar surface of the substrate 14 from perpendicular to the water surface with respect to the z-axis. As shown in FIG. 5, the planar surface of the substrate 14 forms angle "a" with the z-axis, wherein "a" is less than 20 degrees. The deviation is a result-effective variable because the deviation allows for a decrease in the packing density to accommodate changing water conditions. Based on experimental water conditions and the preference toward higher packing density, ideally, the planar surface of the substrate 14 is oriented within a +/−10 degree deviation from perpendicular to the water surface with respect to the z-axis. The term "substantially contains" is defined as within a +/−20 degree deviation of line 88 at the average depth of the substrate 14 from the line of current 20. As shown in FIG. 6, the planar surface 14 contains line 88 at the average depth of the substrate 14. The line of current 20 is near the substrate 14 at the average depth of the substrate 14. The line 88 and line of current 20 form an angle "b", wherein "b" is less than 20 degrees. The deviation is a result-effective variable because the deviation allows for a higher strain position to accommodate variations in the water current. Orienting the substrate within the claimed ranges of "substantially perpendicular" and "substantially contains" achieves the unexpected result of a significant increase in algae production over the prior art (e.g., see Example 2 and Example 8).

In some embodiments, the modular apparatus 10 is configured such that the substrates 14 are locked into a position, and the orientation of the substrates are controlled by the orientation of the modular apparatus 10, such that the planar surface of the substrate 14 is "substantially perpendicular" to the water surface 30 and "substantially contains" the line of current 20. In experiments using our system, for vertically oriented substrates extending to a depth of 2 meters, there was a clear gradient for production in the first two weeks. However, this gradient dropped to less than 20% difference in the later production, see Example 1. In some embodiments, each substrate has a dimension perpendicular to the water surface with a magnitude between 1 and 10 meters. In some embodiments, each substrate may hang vertically from the water surface to a depth of between 1 and 10 meters. The depth of the substrates is a result-effective variable because the depth increases the total yield per unit area and contributes to a significant increase in algae production over prior art, see Example 2. Productivity is dependent on prevailing turbidity, available light and nutrients, and the type of algae, among other factors.

Herein, unless specified otherwise, the term "growth" and "growth rate" are not limited to expansion of a single algae or type of algae. Instead, these terms refer to the increase in algae composite material attached to the substrates, wherein such material includes not only algae of any type, including autotrophic and heterotrophic algae, but also any eukaryotes or prokaryotes, and non-living matter. The substrates in modular apparatus 10, particularly once seeded with algae and other materials, serve not only as templates for expansion and reproduction of species already attached to the substrates, but also as effective filters for other materials.

By orienting the planar surface of the substrate "substantially perpendicular" to the water surface, more substrates can be accommodated in a single area of open water. In a one square meter of open water, the prior art can grow one square meter of algae on the top side of the substrate. In contrast, the methods and systems described herein can include a plurality of substrates within the square meter of open water. The orientation of the substrate allows for water to flow along both sides of the substrate surface, increasing the area for production of algae composite material. The critical orientation of the substrates in open water provides a significant increase in the amount of production per unit area of water surface.

A novel feature of the invention is increased packing density. The term "packing density" is defined as the fraction of a volume filled by a given collection of solids. Packing density is a novel characteristic of this in-water system. Algae can attach and grow well on substrates that are oriented partially or fully vertical. The vertical configuration increases the amount of substrate per surface area of water (see Example 6). The purely vertical orientation is very practical for scaling to larger systems. This geometry has a smaller footprint on the water surface per area of production surface, and it provides access to the surface for fish and other organisms, thereby reducing any negative environmental impacts of a large artificial structure. Experimental results demonstrate that at least seven vertically aligned substrates can be packed per linear meter of water surface without adversely impacting the algae production per substrate, or in other cases with only a modest reduction thereof.

Suitable substrate materials include any material that can provide a template for algae accumulation and can withstand the relatively harsh deployment conditions. Suitable materials for substrates include metals, naturally occurring polymers, and man-made polymers.

For example, man-made polymeric materials can be used as the primary component of the substrates. Representative polymers include, but are not limited to, poly(vinyl) chlorides, polyesters, polyamides, polyfluorocarbons, polyolefins, polyurethanes, polystyrenes, poly(vinyl) alcohols, caprolactams, and copolymers of the foregoing, and elastomeric polymers such as elastic polyolefins, copolyether esters, polyamide polyether block copolymers, ethylene vinyl acetates (EVA), block copolymers having the general formula A-B-A' or A-B like copoly(styrene/ethylene-butylene), styrene-poly(ethylene-propylene)-styrene, styrene-poly(ethylene-butylene)-styrene, (polystyrene/poly(ethylene-butylene)/polystyrene, poly(styrene/ethylene-butylene/styrene), A-B-A-B tetrablock copolymers and the like. Such polymers can also contain additives commonly used in the art including but not limited to stabilizers, colorants, lubricants, plasticizers, extenders, impact modifiers, fillers, antioxidants, ultraviolet light absorbing agents, and densifying agents.

The physical structure of the substrate material can take a number of forms, including a mesh, a lattice, a molded structure, a fabric, including knitted or woven fabrics, nonwoven fabrics, and sheets (metal and non-metal). Note that the substrate does not have to be porous, and can be water-impermeable and still allow accumulation on both sides of the substrate. As used herein, the term "nonwoven fabric" refers to a fabric having a structure of individual fibers or threads which are interlaid, but not in an identifiable manner as in a knitted fabric. Nonwoven webs or fabrics have been formed from many processes, such as, for example, meltblowing processes, spunbonding processes, and bonded carded web processes. The surfaces can be micro-textured, chemically pretreated, or otherwise modified to enhance attachment and production of algae.

For example, referring to FIG. 4, in one embodiment, substrates 14 were constructed from 3 foot by 6.5 foot sections of a high density polyethylene (HDPE) screen with a ⅛ inch mesh. This substrate material provides ample surface area to anchor algae. In another embodiment, a metallic mesh was used. Each substrate 14 within a given modular apparatus 10 can be comprised of different materials.

By orienting the planar surface of the substrate 14 "substantially perpendicular" to the water surface 30, it is possible to greatly increase the production of algae per unit surface area of water. Obviously, this increase depends upon an ability to grow algae at reasonable yields at depths below the water surface, which has been supported by data obtained using prototype apparatuses. For example, there is very little difference in the algae production rate for sub-surface depths ranging from 4 inches (10 cm) to 20 inches (50 cm), as described below in Example 1. The critical orientation of the substrates in open water provides a significant increase in the amount of production per unit area of water surface, an unexpected advantage over the prior art, see Example 2.

The configuration of parallel rows of substrates within modular apparatus 10 naturally blocks wave action for the inner rows of substrates, as demonstrated by experiments in the York River, see Example 2. Wave action perpendicular to the surface of the outer rows of substrates can additionally be completely blocked, blocked by some proportion, or not blocked at all to allow full wave action. These features allow the apparatus to be utilized in open water where the wave action may be too strong for growth, or may cause sloughing of the composite algae material, decreasing measured production and actual yield.

Figure 7:
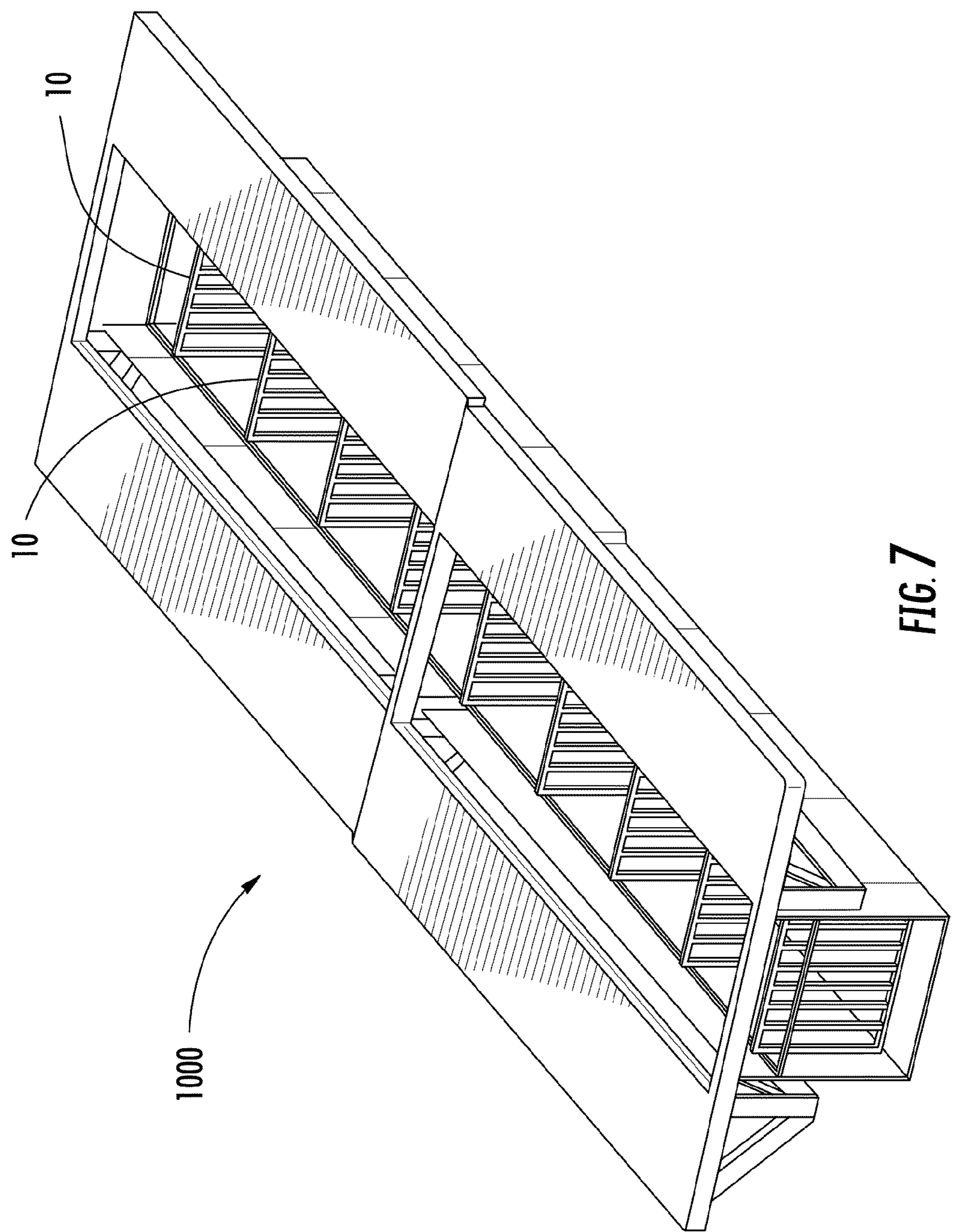
FIG. 7 is a schematic view of a larger system, in this case the York River Research Platform in accordance with the apparatus and method of this invention, shown without insertion of the substrates for algal production and without inclusion of instruments.

As shown in FIG. 7, two modular apparatuses 10 of a plurality of modular apparatuses can be oriented within a larger system 1000, in accordance with this invention. The modular apparatuses 10 can be oriented end-to-end as shown in FIG. 7. Alternatively, modular apparatuses 10 can be place side-by-side as to increase the number of rows (not shown in FIG. 7). It is important to note that each substrate (not shown in FIG. 7) is oriented within each modular apparatus 10 such that the planar surface of each substrate is "substantially perpendicular" to the water surface and "substantially contains" the line of current. One method of allowing the screens to align with the line of current is to moor the fore end of the larger system 1000 to a mooring buoy. This allows the larger system 1000 to self-align with the prevailing tide. That said, it is not necessary for the system to self-align. For example, it can be built with fore-aft symmetry and affixed to the bottom, as long as the front and back are substantially aligned with the prevailing current.

The larger system 1000 may be submerged when the water surface becomes too turbulent or dangerous for the safety of the substrates. It is well-known that open water is calmer farther from the surface.

It is hypothesized that the larger system 1000 may be instrumented such that it self-determines when to submerge. The larger system 1000 may utilize gauges readily available, including wind, force, and buoyancy gauges to determine when the water surface becomes too turbulent or dangerous. It is expected that dangerous conditions will prevent human interaction to submerge the system, thus the need for self-determination. All of the larger system 1000 or part of the larger system such as each modular apparatus 10 may be submerged to an adequate depth of calmer water. When conditions clear, the system 1000 should regain its original position to allow for sufficient light modulation and algae production.

The larger system 1000 can be heavily instrumented. In one embodiment of the invention, a system 1000 is deployed having fluorometers which will be used to measure algal accumulation in situ and determine the optimal time to harvest. We have already shown in some tests that the fluorometer is very sensitive to algal accumulation. These instruments are normally used to measure microscopic algae density in a small region of water close to the instrument. We have observed that they are sensitive to algae mats at short distances (approximately 8 cm away from the instrument). Moreover, as the algal length increases, and the algae approaches closer to the instrument, the fluorescence signal increases rapidly. Increases in the algal density also increase the fluorescence signal, but not as much as the increased algal length. This leads to the ability to automatically monitor algal accumulation and provide a feedback mechanism for various configuration changes as well as the time to harvest. Fluorometers are often used to determine planktonic algae concentrations in water volumes, and can be used to measure attached algae. It was hypothesized that the high density of algal accumulation would deplete the available nutrients in the water column (primarily N, P, and Si) such that there would be a characteristic scale length for nutrient depletion. To measure the water chemistry directly, two methods were employed: grab samples with lab analysis and continuous monitoring via sonde. A WET Labs Cycle $PO_4$ meter was utilized as a practical nutrient monitoring system. Grab samples were taken to double-check the $PO_4$ levels reported by the meter, and also to monitor other important nutrients. The water column pH was monitored via two YSI sondes with appropriate probes. To directly measure possible gradients in biomass yield, two fore and two aft substrates were utilized.

As described with reference to FIG. 3, typical means of harvest include mechanically or hand raking the substrate, trimming or cutting the algae from the substrate, and/or using a vacuum process. It is an object of this invention to provide a standing crop of algae that could at times be harvested while the substrates are still in the water, and at other times be harvested by removing the substrates from the water, as might be needed for cleaning or repair. Automated harvesters are contemplated, including continuous harvesters integrated into the production system.

In one embodiment of the invention, a method for growing and harvesting algae in an open body of water comprises the steps of submerging a first substrate comprising a first planar surface and submerging a second substrate comprising a second planar surface. Filamentous algae are produced on said first planar surface and said second planar surface for a period of time. As previously described, the first substrate and second substrate are oriented such that the planar surface of each substrate 14 is "substantially perpendicular" to the water surface 30. Additionally, each substrate 14 is oriented such that the planar surface of the substrate 14 "substantially contains" the line of current 20. The method additionally comprises waiting for a time period, typically between four days and four weeks from the last harvesting, and then harvesting the algae from the first planar surface and second planar surfaces after the period of time. In a preferred embodiment, the step of harvesting comprises removing the algae (e.g., by mechanical or vacuum means) such that a substantial amount of algae remains on the first planar surface and the second planar surface. For example, in some cases it is preferable to leave a residue of between about 2.5 and 150 grams of algae composite material per square meter of substrate, or in some embodiments between about 3 $g/m^2$ and 30 $g/m^2$ of algae composite material on the substrate. In one embodiment, there are at least three cycles of growth. In some embodiments, the methods of the invention further comprise a second period of growth followed by a second harvesting and a third period of growth followed by a third harvesting. For in-water harvesting, the filamentous algae can be, for example, trimmed with a submerged device, such as but not limited to a cutter, scraper, or brush, such that the first substrate and the second substrate do not have to be removed from the water for harvesting. For out-of-water harvesting, the substrates are harvested by any of a number of methods to harvest the algae or to remove unwanted accumulation as is necessary. In some embodiments, many more than two substrates are used to produce algae, typically five or more, and in commercial embodiments, it is contemplated that thousands of substrates could be used. The harvesting can be a continuous process, and it may be advantageous to harvest some substrates more frequently than others, depending on their respective locations and access, for example, to nutrients.

Research suggests that algae growth (as measured in biomass accumulation per day) in a flowing body of water (e.g., a stream, river, or canal) is most commonly limited by nutrient supply, light availability, and/or grazing by aquatic species. Algae production in the modular algae production system described herein appears at certain times (but not always) to increase exponentially. The theory of exponential growth states that the maximum growth rate is reached at some intermediate density of algae cells present. Thus if one harvests too much algae, the growth rate will be much smaller than the maximum growth rate for several cycles of exponential growth and the net yield will be significantly decreased. Additionally, there may be a theoretical maximum strand length, which is reached when strands are unable to maintain themselves against tensile forces caused by drag in the moving water. Balancing exponential growth with maximum strand length, one may adjust the method of harvesting. Algae production in relatively non-flowing bodies of water (e.g., small lakes, ponds) can also be performed according to the methods of the invention, and in some cases, it may be desirable to enhance the natural motion of the water using, for example, pumps or means for capturing wind energy to facilitate water movement.

With appropriate materials in place to capture harvested algae, one embodiment of a harvester can harvest many rows of substrates at once, in the water, and capture a large percentage of the harvested algae. This method has the additional benefit of producing yields with very high solid content (demonstrated to be above 20%) compared to prior art.

EXAMPLES

The examples that follow are intended in no way to limit the scope of this invention but instead are provided to illustrate representative embodiments of the present invention. Many other embodiments of this invention will be apparent to one skilled in the art.

Example 1

Production as a Function of Water Depth

There is very little difference in the long-term accumulation of algae composite material produced in our modular algae production systems at sub-surface depths ranging from 4 inches (10 cm) to 20 inches (50 cm). For prototypes tested in the York River in Virginia, when the substrate surface was deeper, such as 2 m, there was a clear gradient in the first two weeks using new substrates. The top 1 m of the substrate surface had at least twice as much accumulation as the bottom 1 m. However, this gradient dropped to less than 20% difference in the later time period. By the final harvest, there was no significant difference between the productivity at the top and bottom of the substrates. This suggests that algae can effectively be produced in the open water environments to a depth of greater than 2 m, despite the sometimes turbid environment in the York River which can limit visibility to 30 cm. If a substrate extends deeper than 2 m (e.g., 10 m), then it probably can accumulate even more biomass per water surface area than that reported in Example 2 below. Less turbid or greater solar radiation conditions can increase the depth of productive growth, depending on the location.

Example 2

High Production Rates Relative to Prior Art Systems

The modular apparatus 10 can be designed to block wave action, as demonstrated by experiments in the York River using a "mini-flume" prototype that included six vertical substrates, each having an area just under 2 sq. meters. Two vertically oriented polycarbonate sheets 50 were oriented on each side of the apparatus as shown in FIG. 4. The polycarbonate sheets 50 protect the substrates 14 from heavy wave action. Rigid materials other than polycarbonate would be suitable for this purpose.

Upon deployment in the water as a part of modular apparatus 10, the polycarbonate sheets 50 were oriented such that the planar surface of the sheet 50 was "substantially perpendicular" to the water surface 30. Each polycarbonate sheet 50 blocked wave action perpendicular to substrate. Each polycarbonate sheet 50 had approximately the same dimensions as the substrate 14. Each substrate 14 was approximately 1 m wide, extended 2 m deep, and was separated by 25 cm from either an adjacent substrate or from a polycarbonate sheet. Additionally, each substrate 14 can serve as a similar barrier to other substrates 14. The polycarbonate sheets 50 can be oriented such that wave action can be completely blocked, blocked by some proportion, or not blocked at all to allow full wave action. This feature allows the apparatus to be utilized in open water where the wave action may be too strong for algae growth. By limiting the wave action in specified directions, algae growth can be promoted.

In a model experiment conducted in the York River in Virginia during the summer, three sets of two mesh screens each were used as substrates, and were oriented at various angles to the prevailing current to allow or block prevailing water flow past the screen surface. Initial accumulation of algae composite material occurred at different rates on the various sections, but all three sets of substrates eventually produced algae composite material at a very high rate. The substrates configured to "substantially contain" the water current, and aligned within 20 degrees of the prevailing tidal current, produced the highest rates of algal accumulation. All three sets of screens also showed near uniform production to the deepest ends of the substrates (approximately 2 meters). One substrate from each set was harvested twice, and these substrates produced the highest production rates subsequent to the first harvest. The highest observed average production rate was 98.7 g algae composite material per day per square meter of substrate (note that accumulation occurred on both sides of the screen). This configuration had a packing density factor of 8 $m^2$ of substrate per $m^2$ of water surface, calculated by dividing the screen area per substrate (2 square meters) by the water surface per substrate (¼ square meter). This resulted in a peak overall yield of 790 $g/m^2$ of water surface area/day (dry), measured after a 12-day deployment. These results significantly exceed the reported production rates observed in the prior art, which are often around 30-40 $g/m^2$ of water surface area/day (Dry Weight).

Substrates that were harvested just once had average production rates between 12.6 and 47.5 g/day per square meter of substrate, with higher numbers corresponding to greater time spent in the water (still noting that the calculations were per day). Among the substrates that were harvested twice, in all cases, the yields per day increased after the first harvest, and ranged from a low of 42.8 grams algae composite material per day per square meter of substrate to the aforementioned high of 98.7 grams algae composite material per day per square meter of substrate.

In these harvests, the dry algae had an ash content of 75%-85%, with the lowest ash rates occurring at the latest harvests. It should be noted that this was a highly turbid environment dominated by diatoms (with siliceous shells), and thus the ash content may have been higher than would be experienced at other locations. Obviously there are many factors that influence ash content of the harvested material. The harvested material was typically 10%-15% solids, suggesting easier drying and thus significant cost savings over other algal growth methods with lower solid content at harvest.

As with all such "wild" algae growing systems, various non-algae matter (invertebrates, sediment) was collected as part of the algae composite material, but the overall chemical and energy content was substantially similar to the matter collected on prior art systems.

Example 3

Production of Algae Using a Horizontally Deployed Substrate

At the outset, we attempted to grow and harvest algae using a porous substrate that was oriented horizontally along the water surface. The substrate was attached to a polyvinyl chloride cage and deployed along the York River in Virginia. The substrate was oriented such that the two long axes of the approximately 1 sq. meter substrate were oriented along the xy-plane (i.e., parallel to the water surface). The substrate quickly became bio-fouled with invertebrates, which became so strongly attached that they were extremely difficult to remove. This resulted in very low productivity, although it may have been a function of the substrate material chosen. Additional testing of horizontally deployed substrates, using other substrate materials, resulted in low yields per water surface area relative to the productivity observed with the vertically oriented algae production systems described herein (e.g., the productivity in Example 2 above).

Example 4

Lake Matoaka Research Platform System

A 1.2 meter by 10 meter algae production array was designed and constructed, similar to the model depicted in FIG. 7. An aluminum skeleton was used to build the system, which was floated by attaching 1×10 m floating docks along the sides. This provided a continuous channel for the algae production system. Nine aluminum cubes of approximately 1.2 meters per side were constructed, with two sides and the bottom of each cube sealed with a polycarbonate sheet. The cubes were loaded with substrates (e.g., seven vertically aligned substrates per cube), and the substrate spacing and materials could be varied to test the importance of those variables. When the nine cubes were installed in the center channel, they formed a continuous flume with a depth of a little over one meter and a length of a little over 10 m.

For initial research in Lake Matoaka, a 1000 gallon per minute pump was placed at the aft end of the flume, which pulled the normally stagnant lake water through the flume at a flow rate of about 5 cm/s. A work platform of about 3 m×3 m was attached to the aft end of the flume. Several sets of instruments were used on this work platform, including probes for pH and temperature, sensors measuring phosphate levels in the water, and fluorometers, which were used to measure the accumulated mass of algae composite material. Our goal was to provide a non-destructive indication of algal composite material mass for use in determining a harvest schedule, and procedures were developed to meet this objective.

Example 5

York River Research Platform System

The design of the York River Research Platform ("YRRP") was based on the design of the Lake Matoaka Research Platform described in Example 4, but was upgraded for the more rigorous environment of the York River. The fore end of the YRRP 10 was moored to a mooring buoy, allowing it to self-align with the prevailing tide. The aft end provides access to the YRRP from a flat-decked transport boat, which doubles as a work platform. The center section consists of eight 4' (121 cm)×4' cubes ("cages") made from 1 in (2.54 cm) square tube aluminum, similar to those we designed for the Lake Matoaka Research Platform. These are removable, and are lined on the bottom, left, and right sides with a clear polycarbonate sheet. When installed, the eight tanks form a 10 m long flume, approximately 1 m deep, wherein each substrate extends from about 10 cm below the water surface to 1 m below the water surface. Small cages are provided at the front and rear of the flume to allow the placement of instrumentation. All cages were designed to be locked down to the craft. Aluminum grate walkways on either side of the flume provide access to the substrates and to assist in removal and replacement of the cages. Pontoons run underneath the length of the walkways, providing flotation. A schematic version of the YRRP is shown in FIG. 7, although the substrates 14 are not depicted in FIG. 7, and the mooring buoy is also not depicted in FIG. 7.

The substrates 14 come in various forms. A typical configuration is a flexible sheet or mesh that is stretched and splined into an aluminum frame, much like a standard window screen. In one embodiment used in the YRRP, U-channels are provided to hold the frames, eventually lining up to form seven 10 m long vertical growing surfaces spaced approximately 15 cm apart, and extending from 10 cm below the water surface to 100 cm deep. These frames slide down the channels provided in the cages, and remain in place with no locking mechanism. Substrates can be removed individually (typical) or remain in the cage when removed.

Example 6

Production of Algae Composite Material as a Function of Packing

There was some indication in the previous experiments, e.g., see Example 2, that the production per unit area can be supplemented by an increased packing density. The term "packing density" is defined as the fraction of a volume filled by a given collection of solids. Packing density is a novel characteristic of an in-water system. Horizontal substrates which float on the surface of a body of water fill only a small portion of a volume of open water, unless the water is very shallow. By orienting substrates vertically, the loading of substrate material per unit surface area of the water can be increased dramatically.

Undoubtedly, production of algae composite material will be negatively affected by packing density at some level of packing. That said, if algal production was not affected by packing density in a vertically-oriented algal production system such as the YRRP, or was only minimally affected, then cumulative yield would increase with greater packing density. In preferred embodiments of the invention, substrates, including 2 or more, 5 or more, 10 or more, or 100 or more substrates, are packed with a vertical orientation such that the spacing between each successive substrate is between about 9 cm and 51 cm. When the YRRP was fully loaded, the packing density was 6.3 times the packing density of a horizontally deployed substrate, since per square meter of water surface area, there were seven substrates having a dimension perpendicular to the water surface of 0.9 m.

We tested this issue of packing density using the YRRP in April and May of 2011 in the York River in Virginia. A portion of the YRRP was allocated such that substrates were "double-spaced", i.e., loaded in every other channel, with productivity compared against "single-spaced" substrates.

Figure 8:
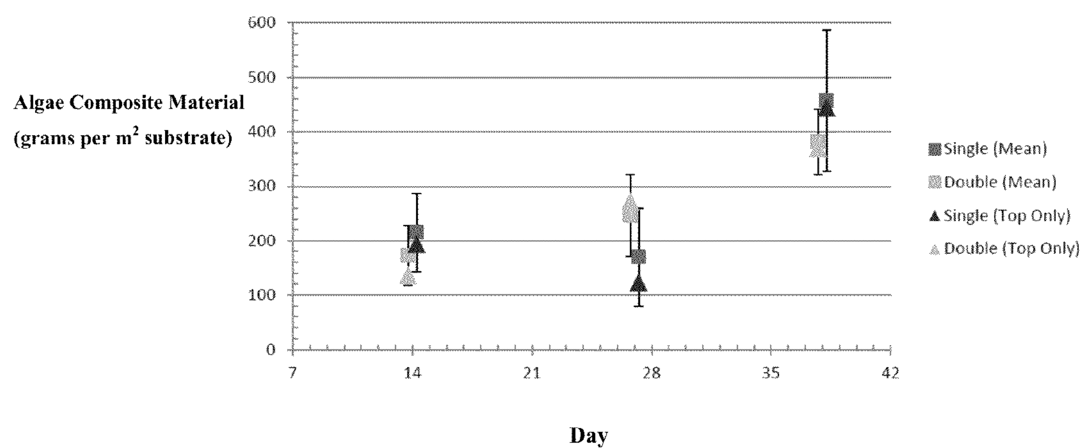
FIG. 8 is a graph showing cumulative production of composite algae material over time, with the key variable being a comparison of the packing densities of the substrates.

FIG. 8 shows the productivity of the single and double-spaced substrates on three sample trials, each with about two weeks of accumulation. Each square data point represents the mean productivity of dried algae composite material, in grams per square meter of substrate, since the previous harvest. The mean is derived from 12 samples from either six single-spaced substrates or six double-spaced substrates (two samples were taken from each substrate). The single-spaced data and double-spaced data were collected on the same days, but are offset slightly in the figure for clarity. There was no statistically significant difference between the two sets of data, from which we conclude that the substrate spacing of approximately 15 cm (single-spaced) did not have a significant negative impact on algal production per square meter of substrate relative to substrates spaced approximately 30 cm apart (double-spaced). Therefore, packing densities of less than 20 cm, and potentially less than 15 cm, can increase overall yield, since increasing the packing density increases the amount of substrate per square meter of water surface.

While prior art algae harvesting systems might use a single square meter of algae-growing substrate per square meter of water surface, our methods can provide an order of magnitude more substrate per square meter of water surface, or potentially even two orders of magnitude more substrate per square meter of water surface. For example, to achieve a 60× increase in substrate area per square meter of water surface, one could contemplate using six vertically oriented substrates per square meter of water surface, with each vertically oriented substrate extending 10 m below the top of the substrate near the water surface.

Example 7

Cumulative Algae Production over Time

The well-known "logistic curve" for population growth is widely assumed to apply to algae. To determine the optimal harvesting period, it was critical to characterize the scale of the growth curve. The optimal harvesting method would be continuously harvest only the last day's growth when the curve is at its steepest point. However, a more practical approach is to build a harvesting system that operates around the linear—and highest—productivity portion of the growth curve, and leaves enough seeded algae to take advantage of the rapidly increasing productivity at the transition from exponential to linear growth.

Figure 9:
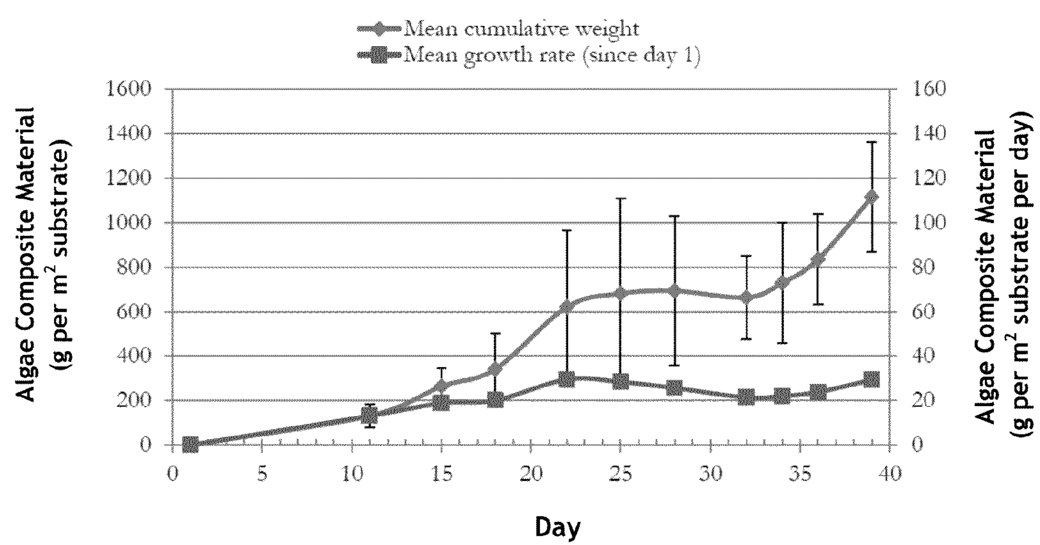
FIG. 9 is a graph showing cumulative production of composite algae material over time, as well as the mean daily production rate for the same samples.

To characterize the cumulative accumulation curve (weight versus time), we sampled quadrats from previously unharvested substrate areas on a frequent (but irregular) schedule. To reduce the effect of sloughing, we alternated sampling different channels on the YRRP, with packing of 7 substrates per meter and inter-substrate spacing of about 15 cm. FIG. 9 shows the mean cumulative mass of dried algae composite material per square meter of substrate, derived by multiplying the 0.1 $m^2$ quadrat sample weights by ten to scale to one square meter, then taking the average of all the samples taken on each sampling day. Also shown is the average productivity from experiment day 1 (April 15) until the day the sample was taken, in grams per square meter of substrate per day.

Figure 10:
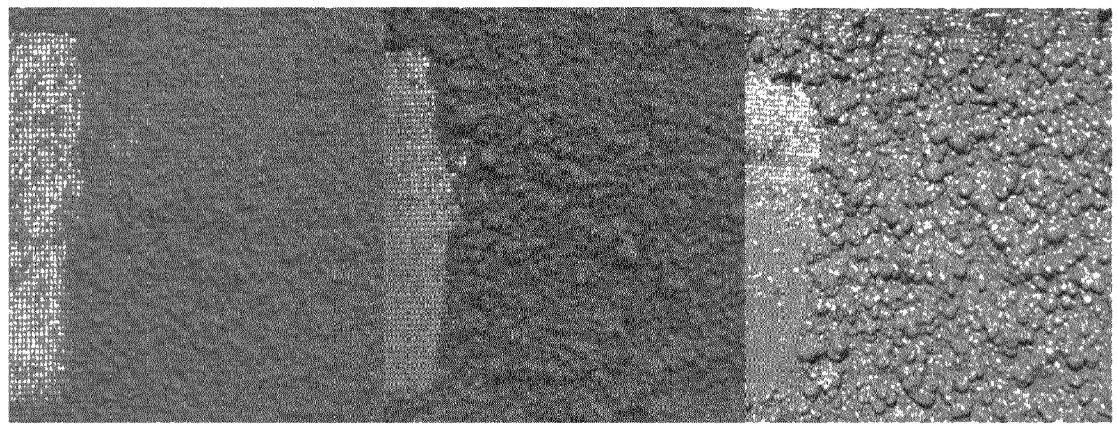
FIG. 10 is a set of three images showing increasing biofouling of a production substrate at time periods since harvesting of 21 days (left panel), 31 days (center panel), and 40 days (right panel).
Figure 11:
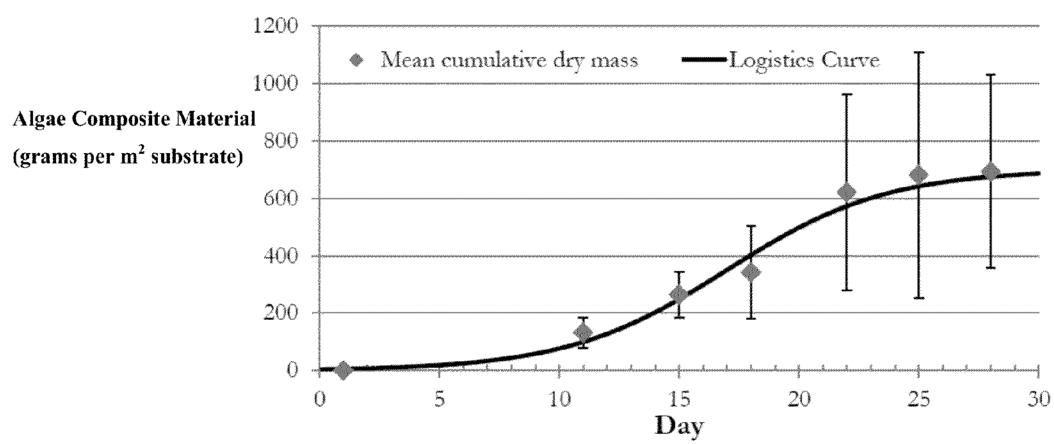
FIG. 11 is a graph showing cumulative production of composite algae material over a 30-day period. A logistic curve is overlaid, with a midpoint occurring about day 17.

Significant biofouling began to occur around day 20, and by day 30 we observed that a large fraction of the harvested mass was comprised of tunicates (sea squirts). In this context, biofouling is defined as competitive accumulation of unwanted organisms that feed on or displace the algae or other microorganisms that we are trying to accumulate. Based on the typical known solid fraction of the algae and the sea squirts, it appears that over 50% of the dry weight was comprised of biofouling by day 40. FIG. 10 shows the progression of the biofouling after day 20, with the left panel corresponding to day 21, the center panel corresponding to day 31, and the right panel corresponding to day 40. FIG. 11 shows the accumulation curve from day 1 through day 30, the point at which we believe that the primary biomass was still algae. A logistic curve is overlaid, with a midpoint occurring about day 17.

We deduce several important results from the shape and parameters of the accumulation curve. First, the productivity does appear to rise through the second and even third week of growth, even when biofouling is taken into account. Second, the growth of algae appears to reach a plateau, which coincided with the start of significant biofouling. Finally, we believe that our concept of "incomplete harvesting" of the substrates has merit, and that a harvesting technology that leaves approximately one or two weeks of accumulation (which is dependent on factors such as water temperature, algal composition, etc.) may be optimal.

Example 8

Harvest Frequency

In this experiment conducted in the spring of 2011, alternating substrates from a given channel of the YRRP, port and starboard, were sampled (then scraped) weekly, while the remainder were sampled bi-weekly. The process was repeated three times, with one variation discussed below. Samples were taken from the center of the substrate, with a mean depth of approximately 0.5 m. Our standard 0.1 $m^2$ quadrat was used to outline the sampling area. We planned to sample six substrates and average the results; however, over the course of the experiment, several substrates were removed for various reasons, and some of the data represents the average of only five samples.

Figure 12:
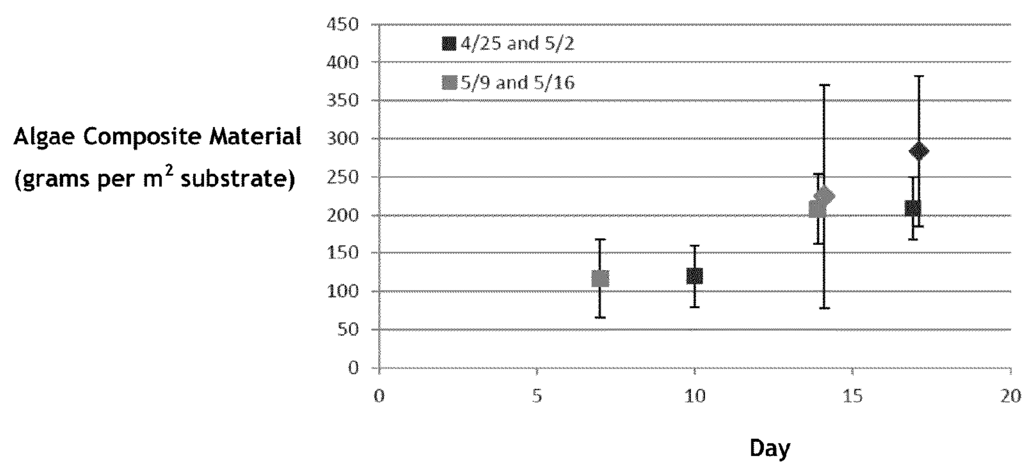
FIG. 12 is a graph showing cumulative production of composite algae material over time, with the key variable being whether the algae is harvested on a weekly basis or on a bi-weekly basis.

FIG. 12 shows these results. The square markers represent the cumulative dried composite algae material production of the weekly harvests (i.e., the first square points represent production from the first harvest, and the second square point represents the cumulative production from the first and second harvest). The diamond markers represent the production from a single harvest covering the same time period (approximately two weeks). Data for the later points is offset slightly in the horizontal direction for visual clarity.

Although variation among samples is higher for the longer harvests, these data (along with the previous experimental cycle) show that bi-weekly harvests are at least as good as, or better than, weekly harvest for long term production. This implies that we can reduce the harvest cost significantly by reducing the number of times the harvester must visit a larger scale system from our initial weekly harvest plan.

During the course of this experiment we observed that the areas which were rigorously sampled were often less productive than the remainder of the substrate, which was quickly (thus more lightly) scraped to reset the experiment for the next trial. Subsequent production was higher outside of the area that was carefully sampled.

Thus, a harvesting methodology that leaves a partial standing crop of algae increases productivity overall. This incomplete harvesting method has been effective, for example, when leaving approximately 1 mm (distance from the algae surface to the substrate surface) of residual attached algae. Depending on experimental parameters including water temperature, nutrients, and algae types, it can be advantageous to incompletely harvest algae such that between about 0.25 mm and 2.5 mm of algae residue remain attached to the substrate. This "seeding" effect enhances post-harvesting accumulation of algae (i.e., prior to a subsequent harvest). In some embodiments, it is advantageous to incompletely harvest algae to leave an algal composite material residue having a dry weight of between 2.5 grams per square meter of substrate surface area and 150 grams per square meter of substrate surface area. In some embodiments, depending on the location and the algal species being produced, it is advantageous to leave an algal residue having a dry weight of between 3 grams per square meter of substrate surface area and 30 grams per square meter of substrate surface area.

To try to take advantage of the higher productivity related to lighter harvests, on the third trial of this experiment we performed a less aggressive scraping of the sampling area. While the depth of the harvest is a relatively subjective factor, we did note a significant increase in cumulative production in both the weekly and bi-weekly harvest. In fact, the productivity for this trial averaged 27.8+/−12.7 grams per square meter of substrate per day, compared to 14.4+/−6.7 grams per square meter of substrate per day for the previous two trials, an improvement of nearly two-fold. The highest productivity recorded for this experiment equated to 175 grams per square meter of water surface area (including packing factor) for all the samples on May 23.

Under these growing conditions, a harvest frequency of 14 to 18 days (and possibly longer) does not reduce, and may actually increase, the cumulative productivity of the system compared to a 7-day harvest schedule.

Example 9

Longitudinal Production Gradient

Obviously, it is conceivable that the reduction of nutrients by algae in the forward portion of the flume may cause lower productivity at the rear of the flume. Since any large-scale production system based on this configuration will effectively form a flume-like device, it is critical to understand the effect, if any, of decreasing nutrients. We performed careful measurements of the water chemistry changes across the length of the flume in this cycle, along with measurements of algae productivity.

The data show a clear downward trend in productivity between the front (cage 3) and the rear (cage 8) of the flume. When the data are divided into the first three sample days—between days 11 and 22 of the experiment—and those that followed, the trend is even more pronounced. During the first three sample days, the trend is almost flat, with each of the five sampled cages (cages 3, 4, 6, 7, and 8) contributing nearly 20% of the total sample weight. During the last three sample days, the forward substrates provided more than double the fraction of the harvest total than did the rear substrates. We conclude that during the period of early, low (but exponentially rising) productivity, the scale length of the growth far exceeds that of the 10 m YRRP. However, during the later, higher productivity periods, with a significant amount of algae in the flume, a definite scale length on the order of 10 m is apparent. This result may be important when considering designs of much larger size scales.

Example 10

Light Intensity as a Function of Depth within the YRRP

Figure 13:
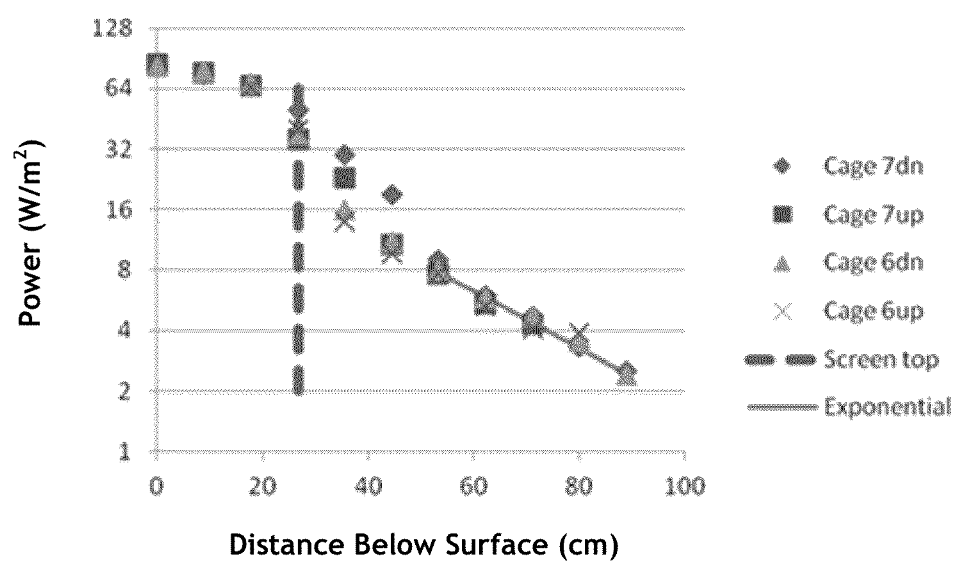
FIG. 13 is a graph showing power from sunlight as a function of depth below the surface within a modular apparatus of the present invention.

In this experiment, we measured the light intensity at various depths within the YRRP. While it is known that algae can grow when deployed on horizontally aligned surfaces many meters below the water surface, to our knowledge those experiments have been conducted in relatively clear waters without vertical obstacles which block light transmission. In our system, for example the YRRP system, the vertically aligned substrate screens block much of the sunlight. The data are provided in FIG. 13. Data was collected on Aug. 2, 2011, in Virginia around noon, in bright sunlight. FIG. 13 shows the light power that reaches the substrates in the YRRP as a function of depth below the surface. Only a small fraction (approximately 10%) of the light at the surface reached the sensor positioned at a depth of 50 cm within the claimed modular apparatus of the invention, and that number decreases thereafter. The relative percentage of light that reaches a particular depth within the algae production apparatus depends not only on factors such as water turbidity, but also depends on how much algae is attached to the substrates, as increasing amounts of attached algae (and other organisms) can decrease the amount of sunlight reaching lower levels.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, a substrate means one substrate or more than one substrate.

Any ranges cited herein are inclusive.

We claim:

1. A method for producing and harvesting algae in an open body of water comprising:

submerging a first substrate comprising a first planar surface and a first thickness;

submerging a second substrate comprising a second planar surface and a second thickness;

waiting for a period of time during which filamentous algae accumulate on said first planar surface and said second planar surface; and harvesting said filamentous algae from said first planar surface and said second planar surfaces after said period of time;

wherein said open body of water has a water surface;

wherein the orientation of said first planar surface and said second planar surface is substantially perpendicular to said water surface during said period of time;

wherein the width of each of said first planar surface and said second planar surface is greater than 0.5 meters;

wherein the surface area of each of said first planar surface and said second planar surface is greater than 0.5 square meters; and wherein said first planar surface has a depth perpendicular to said water surface of greater than 0.5 meters; wherein said first planar surface has a width to depth ratio greater than 0.25; wherein the distance between said first substrate and said second substrate is less than 51 cm; wherein the substrates are configured to yield a packing density of at least 6.3 square meters of total substrate surface area per square meter of water surface.

2. A method of claim 1 wherein said step of harvesting comprises trimming said filamentous algae such that harvesting is incomplete and a substantial amount of said filamentous algae remains on said first planar surface and said second planar surface.

3. A method of claim 2 wherein said substantial amount of said filamentous algae comprises algae composite material trimmed to a distance to the substrate surface of between 0.25 mm and 2.5 mm.

4. A method of claim 2 wherein said substantial amount of said filamentous algae comprises algae composite material having a dry weight of between 3 grams per square meter of substrate surface area and 30 grams per square meter of substrate surface area.

5. A method of claim 1 wherein said filamentous algae is trimmed with a submerged device such that said first substrate and said second substrate do not have to be removed from the water for harvesting.

6. A method of claim 1 further comprising a second period of time followed by a second harvesting.

7. A method of claim 1 wherein the distance between said first substrate and said second substrate is between 9 cm and 51 cm.

8. A method of claim 1 wherein said orientation is within a +/−10 degree deviation from perpendicular to the water surface.

9. A method of claim 1 wherein said orientation substantially contains the line of current.

10. A method of claim 1 wherein said first thickness is substantially smaller than any other dimension of said first substrate; and said second thickness is substantially smaller than any other dimension of said second substrate.

11. A method of claim 1 further comprising submerging a first rigid sheet oriented parallel to said first substrate.

12. A method of claim 1 further comprising submerging at least five additional substrates oriented substantially parallel to said first substrate and second substrate, wherein each additional substrate comprises a planar surface suitable to grow filamentous algae.

13. A method of claim 12 wherein at least five of said substrates have a dimension perpendicular to said water surface of greater than 0.5 meters.

* * * * *